United States Patent
Kim

(10) Patent No.: US 7,992,543 B2
(45) Date of Patent: Aug. 9, 2011

(54) IGNITION SYSTEM OF ENGINE AND CONTROL METHOD THEREOF

(75) Inventor: Deok Ryol Kim, Yongin (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 12/512,694

(22) Filed: Jul. 30, 2009

(65) Prior Publication Data
US 2010/0307452 A1 Dec. 9, 2010

(30) Foreign Application Priority Data
Jun. 9, 2009 (KR) .................. 10-2009-0051119

(51) Int. Cl.
*F02P 5/00* (2006.01)
*F02P 9/00* (2006.01)

(52) U.S. Cl. .................. 123/406.55; 123/609

(58) Field of Classification Search ............... 123/179.5, 123/179.6, 179.12–179.14, 406.11, 406.23, 123/406.25, 406.32, 406.35, 406.47, 406.54, 123/406.55; 701/105, 113
See application file for complete search history.

(56) References Cited

U.S. PATENT DOCUMENTS

| | | | | |
|---|---|---|---|---|
| 4,648,371 A | * | 3/1987 | Kaneta | 123/492 |
| 5,143,553 A | * | 9/1992 | Mukaihira et al. | 123/609 |
| 5,197,430 A | * | 3/1993 | Hoshiba et al. | 123/406.54 |
| 5,357,928 A | * | 10/1994 | Ohtsuka | 123/406.47 |
| 5,909,723 A | * | 6/1999 | Ichimoto et al. | 123/406.19 |
| 6,109,229 A | * | 8/2000 | Pels | 123/179.6 |
| 6,792,346 B2 | * | 9/2004 | Takebayashi et al. | 701/113 |
| 7,505,845 B2 | * | 3/2009 | Yasuda et al. | 701/103 |
| 2003/0034008 A1 | * | 2/2003 | Katoh et al. | 123/406.5 |
| 2006/0000460 A1 | * | 1/2006 | Masters et al. | 123/609 |
| 2006/0225702 A1 | * | 10/2006 | Gray et al. | 123/406.59 |

FOREIGN PATENT DOCUMENTS

JP 2001-32758 A 2/2001

* cited by examiner

*Primary Examiner* — John T Kwon
*Assistant Examiner* — Johnny H Hoang
(74) *Attorney, Agent, or Firm* — Morgan, Lewis & Bockius LLP

(57) ABSTRACT

An ignition system of an engine may include an ignition device that uses the current that is supplied to an ignition coil to generate spark in the combustion chamber, a starting detecting portion that detects the starting signal for starting a stopped engine, a coolant temperature detecting portion that detects the coolant temperature of the engine, and a power control portion that increases the dwell time of the current that is supplied to the ignition coil for a predetermined time after starting the engine, in a case that the starting signal is detected and the coolant temperature is lower than a predetermined level. Accordingly, if the temperature of the engine is low, the dwell time is increased for a predetermined time such that the spark is effectively formed in the cylinder to sable the starting of the engine in the ignition system of an engine according to the present invention.

9 Claims, 3 Drawing Sheets

IGNITION SYSTEM OF ENGINE AND CONTROL METHOD THEREOF

CROSS-REFERENCE TO RELATED APPLICATION

The present application claims priority to Korean Patent Application No. 10-2009-0051119 filed on Jun. 9, 2009, the entire contents of which are incorporated herein for all purposes by this reference.

BACKGROUND OF THE INVENTION

1. Field of the Invention

The present invention relates to an ignition system of an engine. More particularly, the present invention relates to an ignition system of an engine that the security of the early startup thereof is improved, and the control method thereof.

2. Description of Related Art

Generally, the gasoline direct injection engine combusts thin fuel so as to reduce the exhaust gas thereof. However, the high energy is to be supplied so as to enhance the stability of the combustion in the thin fuel condition.

The method for raising the energy of an ignition coil are widening the core area inside a coil or increasing the wound number of times of the coil, but there are problems that the size thereof becomes larger and the cost is increased.

Particularly, because the thin fuel combusts with air, there is a problem that the starting stability is poor in a low temperature of an engine or in an early stage of the starting.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an ignition system of an engine having advantages of improving a starting stability in a low temperature.

In an aspect of the present invention, an ignition system of an engine may include an ignition device that uses a current that is supplied to an ignition coil to generate spark in a combustion chamber of the engine, a starting detecting portion that detects a starting signal for starting a stopped engine, a coolant temperature detecting portion that detects a coolant temperature of the engine, and a power control portion that increases a dwell time of the current that is supplied to the ignition coil for a predetermined time after starting the engine, in a case that the starting signal is detected and the coolant temperature is lower than a predetermined temperature.

The predetermined time may be within approximately 10 ms, and the predetermined temperature may be approximately 0 degree Celsius.

A normal dwell time may be approximately 1.7 ms, and the increased raised dwell time may be approximately 2.4 ms.

The starting detecting portion may detect the starting signal for starting a start motor or a current that is transferred to the start motor, and the power control portion increases the dwell time for the predetermined time from a detecting point to start the engine.

In case that predetermined time is elapsed, the power control portion may apply a normal dwell time map to the current supplied to the ignition coil.

In another aspect of the present invention, the ignition system of an engine, may include an ignition device that uses a current that is supplied from an ignition coil to generate spark in a combustion chamber of the engine, a coolant temperature detecting portion that detects a coolant temperature of the engine, and a power control portion that increase a dwell time of the current that is supplied from the ignition coil for a predetermined time after a starting point of the engine in a case that the coolant temperature is lower than a predetermined temperature.

In further another aspect of the present invention, a method for controlling an ignition system of an engine that includes an ignition device that uses a current that is supplied from an ignition coil to make spark in a combustion chamber of the engine, may include a) detecting a starting signal for starting the engine, b) detecting a temperature of a coolant of the engine, and c) increasing a dwell time of the current that is supplied from the ignition coil for a predetermined time from a starting point of the engine in a case that the starting signal is detected and the temperature of the coolant is lower than a predetermined temperature.

The method for controlling an ignition system of an engine may further include a step of applying a normal dwell time map after the predetermined time is elapsed after the step c).

In another aspect of the present invention, an ignition system of an engine, may include an injector that directly injects fuel into a cylinder, an ignition device that uses a current that is supplied from an ignition coil to generate spark in a combustion chamber of the engine, a coolant temperature detecting portion that detects a coolant temperature of the engine, and a power control portion that increase a dwell time of the current that is supplied from the ignition coil for a predetermined time after a starting point of the engine in a case that the coolant temperature is lower than a predetermined temperature.

In various aspect of the present invention, in a case that the temperature of the engine is low, the dwell time is increased for a predetermined time such that the spark is effectively formed in the cylinder to sable the starting of the engine in the ignition system of an engine according to the present invention.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
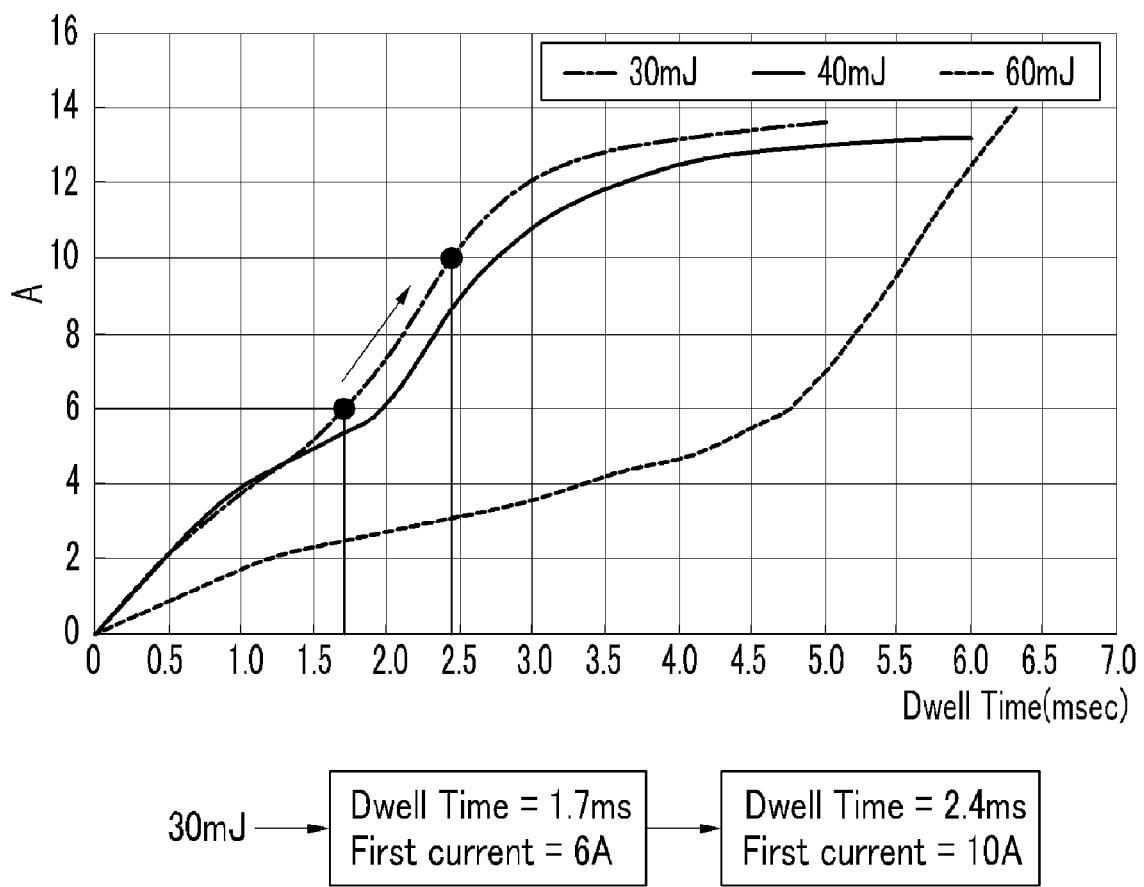
FIG. 1 is a graph showing dwell time and the current of ignition coil in an ignition system of an engine according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION OF THE INVENTION

In the figures, reference numbers refer to the same or equivalent parts of the present invention throughout the several figures of the drawing.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

A gasoline direct injection (GDI) engine uses a direct injection injector to directly inject fuel into the combustion chamber thereof differently from MPI (multi point injection) engine.

Particularly, because the fuel is thin, the high energy is to be supplied to the ignition coil thereof, and there are many cases that the starting stability thereof is deteriorated in a case that the temperature of the engine is low in winter.

In a case that the coolant temperature is low, the hardware of the ignition coil is not changed in an exemplary embodiment of the present invention, but the dwell time of the current that is supplied to the ignition coil is increased so as to raise the energy that is generated from the ignition coil.

Generally, the dwell time signifies the current supplying interval that is transferred to a primary coil for ignition, as the current supplying interval becomes longer, the charged energy is increased such that the induction voltage of a secondary coil is raised when the circuit is intermitted. Accordingly, it is advantageous that the air/fuel mixed gas is securely ignited. But, as the dwell time is lengthened, the life span of the ignition related components can be reduced.

FIG. 1 is a graph showing dwell time and the current of ignition coil in an ignition system of an engine according to an exemplary embodiment of the present invention.

Referring to FIG. 1, a horizontal axis denotes the dwell time, a vertical axis denotes a first current according to the dwell time, and as the dwell time is long, the first current is increased.

According to the capacity of the ignition coil, there are a first ignition coil (energy capacity 30 mJ), a second ignition coil (energy capacity 40 mJ), and a third ignition coil (energy capacity 60 mJ,) and the current size of the first side of the first ignition coil is 6 A when the dwell time thereof is 1.7 ms and when the dwell time is increased to 2.4 ms, the current size thereof is 10 A.

Figure 2:
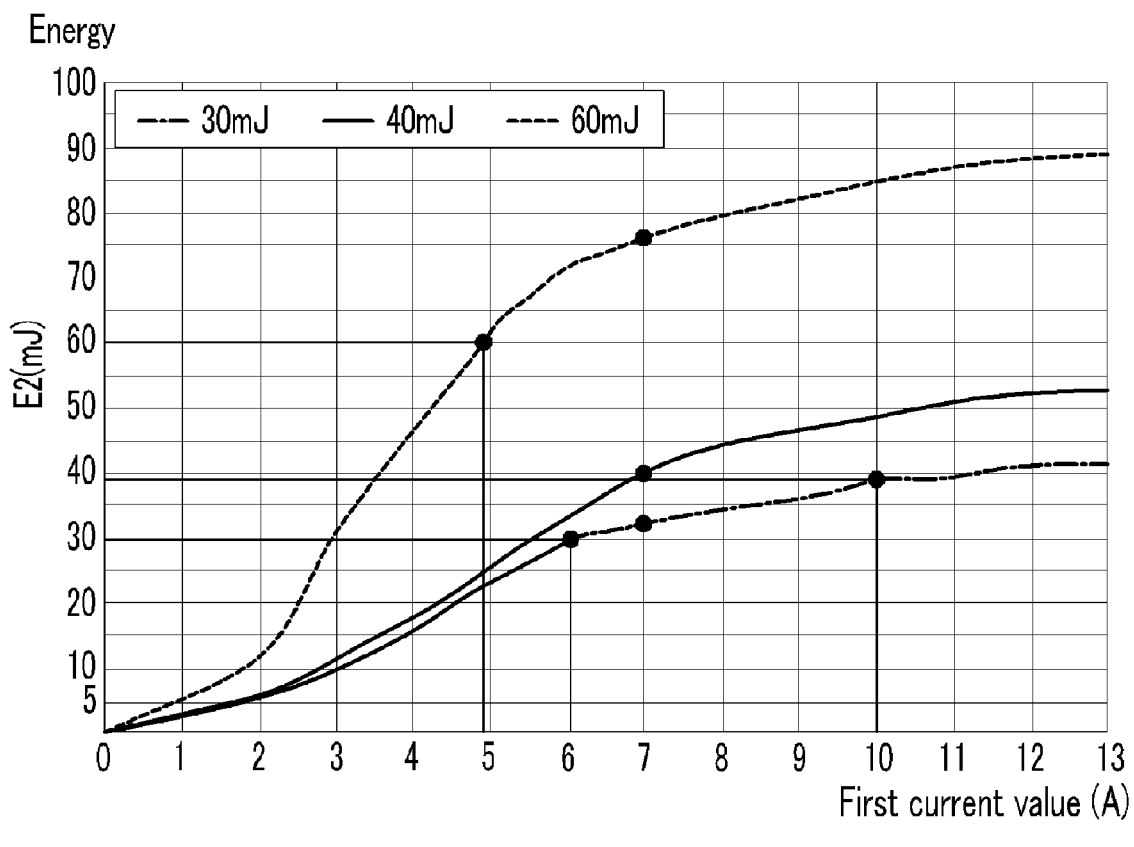
FIG. 2 is a graph showing the current and the energy of an ignition coil in an ignition system of an engine according to an exemplary embodiment of the present invention.
Figure 2:
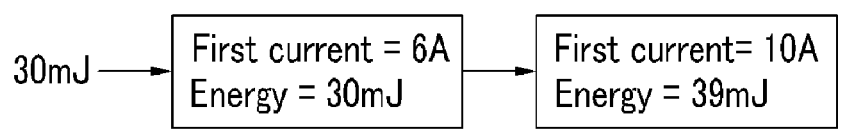

FIG. 2 is a graph showing the current and the energy of an ignition coil in an ignition system of an engine according to an exemplary embodiment of the present invention.

Referring to FIG. 2, a horizontal axis denotes a first current, and a vertical axis denotes the energy level of the ignition coil.

In a case that the first current of the first ignition coil (energy capacity 30 mJ) is 6 A, the formed energy is 30 mJ, and when the first current is 10 A, the formed energy is 39 mJ.

As described above, in a condition that the hardware of the ignition coil is not changed hardware (coil number or the core area), the energy that is generated from the ignition coil can be increased. Merely, it is necessary to restrict the dwell time not to excessively generate the heat from the ignition coil.

In an exemplary embodiment of the present invention, in a case that the coolant temperature is only lower than a predetermined temperature (e.g., 0 degree Celsius,) the dwell time is increased for a predetermined time (within 10 ms) after starting so as to effectively start up an engine. Actually, considering the rotation speed of the engine and the cylinder number, the dwell time can be extended up to 3 ms.

Figure 3:
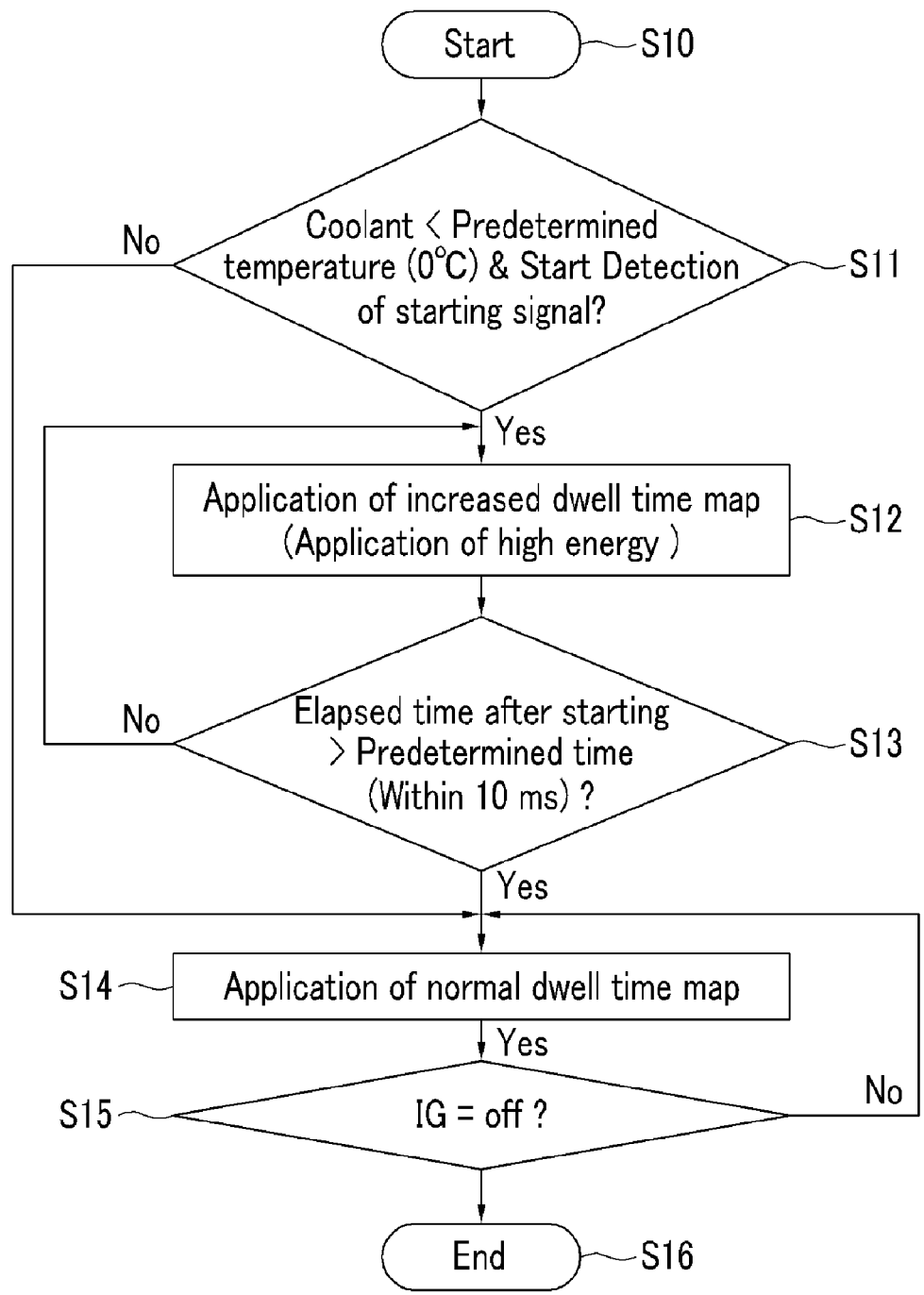
FIG. 3 is a flowchart showing the method for controlling an ignition system of an engine according to an exemplary embodiment of the present invention.

FIG. 3 is a flowchart showing the method for controlling an ignition system of an engine according to an exemplary embodiment of the present invention.

Referring to FIG. 3, the ignition system of an engine starts to be controlled in a zero step S10, the coolant temperature is detected and it is determined that the coolant temperature is lower than a predetermined temperature in a first step S11.

Further, a starting signal is detected in the first step S11, and wherein the starting signal can be a starting signal for operating a start motor or the current that is supplied to the start motor.

If the coolant temperature is lower than the predetermined temperature in the first step S11 and the starting signal is detected in the second step S12, the map having the increased dwell time is applied such that the high energy is generated from the ignition coil.

In a third step S13, it is determined that a predetermined time is elapsed or not after the starting signal is detected.

In the third step S13, if the predetermined time is elapsed, the normal dwell time map is applied to be operated in a fourth step S14.

In an exemplary embodiment of the present invention, the predetermined temperature of the coolant can be 0 degree Celsius, and it is desirable that the predetermined time is within 10 ms not to degrade the ignition coil.

When the temperature of the engine is low in winter, there is a problem in which the engine is not started up at a time, but the dwell time that is transferred to the ignition coil is increased to resolve the above problem in the present invention.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An ignition system of an engine, comprising:
   an ignition device that uses a current that is supplied to an ignition coil to generate spark in a combustion chamber of the engine;
   a starting detecting portion that detects a starting signal for starting a stopped engine;
   a coolant temperature detecting portion that detects a coolant temperature of the engine; and
   a power control portion that includes a primary coil and a second coil, and increases a dwell time of the current that is supplied to the primary coil so as to increase a charged energy of the secondary coil such that an induction voltage of the secondary coil is increased, in a case that the starting signal is detected and the coolant temperature is lower than a predetermined temperature.

2. The ignition system of an engine of claim 1, wherein the predetermined time is within approximately 10 ms, and the predetermined temperature is approximately 0 degree Celsius.

3. The ignition system of an engine of claim 1, wherein a normal dwell time is approximately 1.7 ms, and the increased raised dwell time is approximately 2.4 ms.

4. The ignition system of an engine of claim 1, wherein the starting detecting portion detects the starting signal for starting a start motor or a current that is transferred to the start motor, and the power control portion increases the dwell time for the predetermined time from a detecting point to start the engine.

5. The ignition system of an engine of claim 1, wherein in case that predetermined time is elapsed, the power control portion applies a normal dwell time map to the current supplied to the ignition coil.

6. An ignition system of an engine, comprising:
   an ignition device that uses a current that is supplied from an ignition coil to generate spark in a combustion chamber of the engine;
   a coolant temperature detecting portion that detects a coolant temperature of the engine; and
   a power control portion that includes a primary coil and a second coil, and increase a dwell time of the current that is supplied to the primary coil so as to increase a charged energy of the secondary coil such that an induction voltage of the secondary coil is increased in a case that the coolant temperature is lower than a predetermined temperature.

7. A method for controlling an ignition system of an engine that includes an ignition device that uses a current that is supplied from an ignition coil to make spark in a combustion chamber of the engine, comprising:
   a) detecting a starting signal for starting the engine;
   b) detecting a temperature of a coolant of the engine; and
   c) increasing a dwell time of the current that is supplied to a primary coil so as to increase a charged energy of a secondary coil such that an induction voltage of the secondary coil is increased in a case that the starting signal is detected and the temperature of the coolant is lower than a predetermined temperature.

8. The method for controlling an ignition system of an engine of claim 7, further including a step of
   applying a normal dwell time map after the predetermined time is elapsed after the step c).

9. An ignition system of an engine, comprising:
   an injector that directly injects fuel into a cylinder;
   an ignition device that uses a current that is supplied from an ignition coil to generate spark in a combustion chamber of the engine;
   a coolant temperature detecting portion that detects a coolant temperature of the engine; and
   a power control portion that includes a primary coil and a second coil, and increase a dwell time of the current that is supplied to the primary coil so as to increase a charged energy of the secondary coil such that an induction voltage of the secondary coil is increased in a case that the coolant temperature is lower than a predetermined temperature.

* * * * *